W. Kegg.
Reciprocating Churn.
N° 93,207. Patented Aug. 3, 1869.

Witnesses.
A. W. Almquist
O. Hinchman

Inventor.
Wm Kegg
per Munn & Co.
Attys.

United States Patent Office.

WILLIAM KEGG, OF LASSELLSVILLE, NEW YORK.

Letters Patent No. 93,207, dated August 3, 1869.

---

IMPROVEMENT IN CHURN-DASHERS.

---

The Schedule referred to in these Letters Patent and making part of the same

---

*To all whom it may concern:*

Be it known that I, WILLIAM KEGG, of Lassellsville, in the county of Fulton, and State of New York, have invented a new and useful Improvement in Churn-Dashers; and I do hereby declare that the following is a full, clear, and exact description thereof, which will enable others skilled in the art to make and use the same, reference being had to the accompanying drawings, forming part of this specification.

This invention relates to new and useful improvements in churning butter, and consists in the peculiar form and construction of the dasher, in the method of aerating or supplying atmospheric air to the cream, and regulating the temperature thereof, as hereinafter more fully described.

In the accompanying sheet of drawings—

Similar letters of reference indicate corresponding parts.

In this drawing, the churn is seen in red color.

A is the dasher.

B is the staff or handle.

The staff is a tube, having a detachable head, B', near its upper end, with valve-recess and valve C therein, which valve opens from the pressure of the atmosphere when the dasher is raised, and admits air into the tubular handle, and closes when it descends.

The air is discharged into the cream beneath the dasher at every stroke.

The peculiar form of the dasher causes a whirling motion in the cream, producing a partial vacuum beneath the dasher, into which the air rushes as the dasher is raised.

Figure 1:
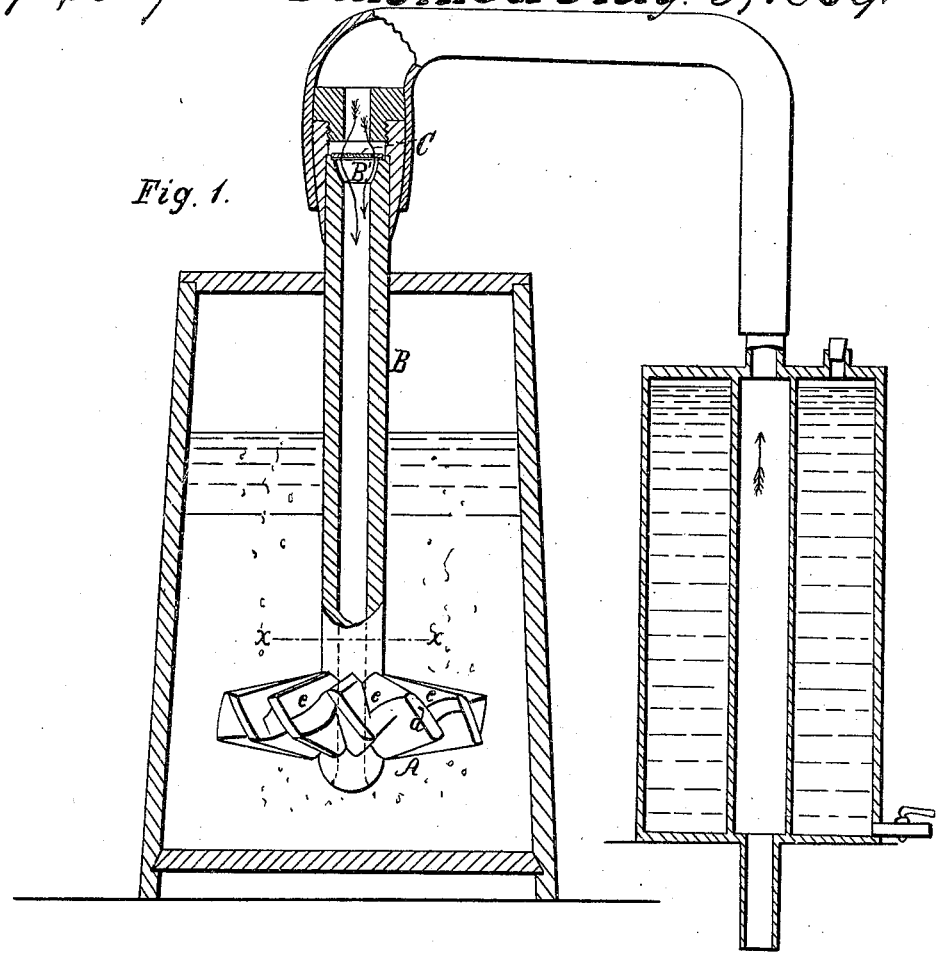
Figure 1 represents a view of the dasher, showing a tubular staff, with an air-valve therein, the same being connected by an elastic tube, with a water-tank through which the air is drawn, the tank being shown in red color.
Figure 2:
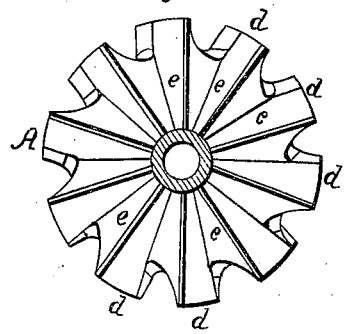
Figure 2 is a view of the churn-dasher, looking from the line x x of fig. 1.

The dasher, on its periphery, presents a succession of wings, the ends of which are seen in fig. 1, standing at an incline of about forty-five degrees.

Between them, for about two-thirds of the diameter, the dasher is solid, and forms V-shaped channels or recesses on each side, or above and below, which incline from the staff toward the periphery, or ends of the wings.

d represents the inclined ends of the wings, and e the V-shaped channels from the centre to the periphery.

It is well known that it is necessary to keep the cream at the right temperature to insure anything like a quick operation in churning butter.

The common way is to throw in hot water, if the cream is too cold, and cold water if it is too warm. This is never done without more or less injury to the butter.

Keeping the cream properly aerated does not injure the butter under any circumstances, whether the air introduced is warm or cold.

I therefore temper the air, which is introduced by drawing it through a vessel or tank of either cold, warm, or hot water, as the case may be, thus raising or lowering the temperature of the cream, by means of the air introduced.

I do not broadly claim introducing air to the cream in the churn through a tubular staff or dasher-handle, as I am aware that it is not new.

Having thus described my invention,

What I claim as new, and desire to secure by Letters Patent, is—

1. The dasher A, constructed as described, with the inclined wings d, and V-shaped recesses e, said dasher being attached to the tubular shaft B, having the valve C at its upper end, as herein set forth and shown, for the purpose specified.

2. Introducing air into the cream through the tubular dasher-shaft B, by means of the pipe attached to the upper end of said dasher, and communicating with a water-tank, through which the air passes, as herein described, for the purpose specified.

The above specification of my invention signed by me, this 21st day of April, 1869.

WM. KEGG.

Witnesses:
FRANK BLOCKLEY,
ALEX. F. ROBERTS.